United States Patent Office 3,420,872
Patented Jan. 7, 1969

3,420,872
DIPHENETHYLBENZENE TETRACARBOXYLIC
ACID ESTERS
Ferdinand B. Zienty, Warson Woods, and Myron J. Holm,
Olivette, Mo., assignors to Monsanto Company, St.
Louis, Mo., a corporation of Delaware
No Drawing. Original application June 5, 1964, Ser. No.
373,065, now Patent No. 3,293,276, dated Dec. 20,
1966. Divided and this application Mar. 24, 1966, Ser.
No. 537,002
U.S. Cl. 260—475                                4 Claims
Int. Cl. C07c 69/76

ABSTRACT OF THE DISCLOSURE

Certain hydrocarbyl and hydrocarbyl diphenethylbenzene tetracarboxylic acid esters are valuable as resin intermediates, plasticizers, flameproofing agents, gear oil additives, grease additives, fungicides and bacteriostats.

---

The present application is a division of our copending application Ser. No. 373,065 filed June 5, 1964, now U.S. Patent 3,293,278, granted Dec. 20, 1966.

This invention relates to new chemical compounds and particularly to esters of diphenethylbenzene tetracarboxylic acid. These compounds which exhibit utility as synthetic resin intermediates are characterized by the following structural formula:

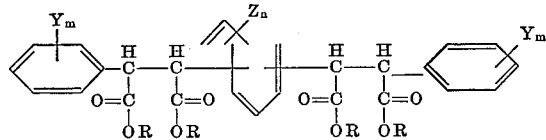

where R is hydrocarbyl, each being selected from the group consisting of alkyl, alkenyl, cycloalkyl, phenyl, alkyl substituted phenyl or monocyclic aralkyl radicals each containing from 1 to 18 carbon atoms, Y is a monovalent substituent selected from the group consisting of hydrocarbyl or hydrocarbyl oxy each containing from 1 to 18 carbon atoms, nitro radicals, halogens and secondary and tertiary amino radicals, Z is a monovalent substituent selected from the group consisting of methyl radicals and halogens, $m$ is a cardinal number from 0 to 5 inclusive, and $n$ is a cardinal number from 0 to 4 inclusive.

Tetracyanodiphenethylbenzene, the parent compound of the present group, can be prepared by the condensation of a benzenediacetonitrile with a benzaldehyde to form dibenzylidenebenzenediacetonitrile followed by cyanation of the dibenzylidenebenzenediacetonitrile. The condensation and cyanation can be conducted in a one-step operation, or the introduction of the additional nitrile groups can be deferred until the condensation is complete. The tetracyanodiphenethylbenzene thus obtained can be hydrolized to the tetracarboxylic acid of diphenethylbenzene. The esters are thus readily formed from the acids obtained.

As indicated above, benzaldehyde can be used in the preparation of the present invention. However, in the preparation of compounds having substituents on the terminal benzene rings, it is preferred to use substituted benzaldehydes rather than to add the substituents after the condensation reaction. Specific examples of substituted benzaldehydes that can be employed include methylbenzaldehydes, ethylbenzaldehydes, propylbenzaldehydes, butylbenzaldehydes, decylbenzaldehydes, dodecylbenzaldehydes, octylbenzaldehydes, methoxybenzaldehydes, ethoxybenzaldehydes, propoxybenzaldehydes, butoxybenzaldehydes, nonoxybenzaldehydes, undecoxybenzaldehydes, octadecoxybenzaldehydes, phenylbenzaldehydes, tolylbenzaldehydes, phenoxybenzaldehydes, toloxybenzaldehydes, nitrobenzaldehydes, chlorobenzaldehydes, fluorobenzaldehydes, bromobenzaldehydes, iodobenzaldehydes, nitrohalobenzaldehydes, alkylhalobenzaldehydes, alkoxyhalobenzaldehydes, aroxyhalobenzaldehydes, alkylnitrobenzaldehydes, alkylnitrohalobenzaldehydes and the like. The substituents on the benzaldehyde nucleus can vary in number from one through five, be like or unlike, and members of the groups indicated hereinbefore.

The benzenediacetonitrile to be condensed with the benzaldehyde may be ortho, meta or para, substituted or unsubstituted. Suitable benzenediacetonitrile include mono-, di-, tri-, and tetra-methylbenzenediacetonitrile, mono-, di-, tri- and tetra-chlorobenzenediacetonitriles, mono-, tri- and tetra-fluorobenzenediacetonitriles, mono-, di- tri- and tetra - bromobenzenediacetonitriles, and mono-, di-, tri- and tetra-iodobenzenediacetonitriles. Mixed halobenzenediacetonitriles and methylhalobenzenediacetonitriles may also be employed. Examples of suitable benzenediacetonitriles of these groups include chlorofluoro-, chlorobromo-, chloroiodo-, fluorobromo-, fluoroiodo-, bromochloro-, bromoiodo-, chlorobromoiodo-, methylchloro-, methylfluoro-, methyliodo-, methylbromobenzenediacetonitriles and the like.

As indicated above, R in the foregoing formula is a hydrocarbon group containing from one to eighteen carbon atoms. Representative alkyl groups include methyl, ethyl, propyl, butyl, pentyl, hexyl, heptyl, octyl, nonyl, decyl, hendecyl, dodecyl, tridecyl, tetradecyl, pentadecyl, hexadecyl, heptadecyl, octadecyl and the like. Suitable alkenyl groups include, for example, vinyl, propenyl, butenyl, pentenyl, hexenyl, heptenyl, octenyl, nonenyl, decenyl, hendecenyl, dodecenyl, tridecenyl, tetradecenyl, pentadecenyl, hexadecenyl, heptadecenyl, octadecenyl and the like. Alkenyl groups containing more than one double bond are also suitable. Cycloalkyl groups represented by R include cyclopropyl, cyclobutyl, cyclopentyl, cyclohexyl, cycloheptyl, cyclooctyl and the like. The cycloalkyl groups can have one or more hydrocarbon side chains to provide substituted cycloalkyl groups containing as many as eighteen carbon atoms. Aryl groups represented by R include phenyl, and alkyl substituted phenyl such as tolyl, xylyl, ethylphenyl, propylphenyl, butylphenyl, pentylphenyl, hexylphenyl, heptylphenyl, octylphenyl, nonylphenyl, decylphenyl, hendecylphenyl, dodecylphenyl and the like. Thus, the aryl groups can have one or more alkyl substituents containing a maximum of twelve carbon atoms. Representative monocyclic aralkyl or alkyl groups designated by R include benzyl, phenylethyl, phenylpropyl, phenylbutyl, phenylpentyl, phenylhexyl, phenylheptyl, phenyloctyl, phenylnonyl, phenyldecyl, phenylhendecyl, phenyldodecyl, xylylethyl and the like. While it is preferred that all of the above hydrocarbon groups are unsubstituted, they can have nitro groups or halogens. Also, the hydrocarbon chains can be either straight or branched.

The invention will be further clarified by reference to the following detailed descriptions of the preparation of compounds encompassed thereby. Unless otherwise specified, all proportions in these examples and throughout the specification are expressed in parts by weight.

The $\alpha,\alpha',\beta,\beta'$-tetracarboxylic acids utilized in the following examples are prepared by the condensation of benzaldehyde with a suitable benzenediacetonitrile, the cyanation with sodium cyanide of the condensation product, and thereafter the nitrile is fully hydrolized to the acid form as set forth in our copending application Ser. No. 373,065 filed June 5, 1964, now U.S. Patent 3,293,278.

Example 1.—Tetramethyl p-diphenethylbenzene-α,α',β,β'-tetracarboxylate

To a suspension of 41.8 g. of p-diphenethylbenzene-α,α',β,β'-tetracarboxylic acid in 1 liter of methanol there was added 100 ml. of sulfuric acid. The mixture was heated for 12 hours, cooled, and the precipitate was collected, washed with methanol, then water, and dried. The product was gray-white and melted at temperatures above 250° C. The infrared spectrum was consistent with the assigned structure.

*Analysis.*—Calc'd for $C_{30}H_{30}O_8$ (518.54): C, 69.48; H, 5.83. Found: C, 68.5; H, 6.08.

Example 2.—Tetraoctyl p-diphenethylbenzene-α,α',β,β'-tetracarboxylate

A 10 g. sample of p-diphenethylbenzene-4,4'-diphenoxy tetracarboxylic acid was mixed with 100 ml. of octyl alcohol and 10 ml. of concentrated sulfuric acid and the stirred suspension was heated for 7 hours at 100°, then 5 hours at 110°. The solid which had failed to dissolve (starting material) was removed by filtration, washed and dried.

Ethyl acetate and water were added to the filtrate, and the mixture was neutralized by the addition of alkali. The organic phase was separated, washed and steam distilled. After removal of the excess alcohol, the organic phase was diluted with ethyl acetate, dried, and allowed to crystallize. After collection, the precipitate was washed with an ethyl acetate-isooctane mixture and dried. The infrared spectrum was consistent with the assigned structure.

*Analysis.*—Calc'd for $C_{58}H_{86}O_8$ tetraester (911.27): C, 76.44; H, 9.51; saponification equivalent, 227.82. Found: C, 76.23; H, 9.13; saponification equivalent, 225.5.

The higher tetraalkyl tetracarboxylates of diphenethylbenzenes are preferably prepared by the esterification of the tetra acid. However, they may also be synthesized by transesterification of a lower tetraalkyl tetracarboxylate, such as the methyl of Example 1, or by direct alcoholysis of the corresponding tetranitrile prepared as set forth in applicants' parent application, Ser. No. 373,065, filed June 5, 1964.

Example 3.—Tetracyclopentyl p-diphenethylbenzene-α,α',β,β'-tetracarboxylate

The procedure of Example 2 is followed using cyclopentanol in place of octyl alcohol.

Example 4.—Tetra(dimethylcyclohexyl) p-diphenethylbenzene-α,α',β,β'-tetracarboxylate The procedure of Example 2 is followed using dimethylcyclohexanol in place of octyl alcohol.

Example 5.—Tetra (β-cyclohexylethyl) p-diphenethylbenzene-α,α',β,β'-tetracarboxylate The procedure of Example 2 is followed using β-cyclohexylethanol in place of octyl alcohol.

Example 6.—Tetra (β-phenethyl) p-diphenethylbenzene-α,α',β,β'-tetracarboxylate The procedure of Example 2 is followed using β-phenethyl alcohol in place of octyl alcohol.

Example 7.—Tetraphenyl p-diphenethylbenzene-α,α',β,β'-tetracarboxylate

About 10 grams of p-diphenethylbenzene-α,α',β,β'-tetracarbonyl chloride prepared by reacting the corresponding carboxylic acid with thionyl chloride is treated with about 50 grams of phenol and the mixture heated at approximately 80° until the evolution of hydrogen chloride has ceased. Removal of the excess phenol by distillation under reduced pressure yields the tetraphenyl ester.

The compounds produced in accordance with the present invention are crystalline compounds of moderate molecular weight. They are insoluble in water, but readily soluble in a variety of commercially available solvents. They are of particular value as resin intermediates, and also as (intermediates in the preparation of) plasticizers, flame proofing agents, gear oil additives, high temperature grease additives, fungicides and in numerous other industrial applications. In addition a number of the compounds under consideration exhibit bacteriostatic properties. These products are also valuable since they present a series of compounds in which the melting point can be varied while the chemical characteristics are maintained substantially constant. High melting products are obtained by using the para form of benzene diacetonitrile as the starting material, whereas the ortho and meta benzene diacetonitriles yield lower melting products. The present tetraesters and diacid diesters can be used as plasticizers for polyvinyl chloride resins, imparting unusually low volatility to the resin compositions.

Numerous modifications and additional compounds will readily suggest themselves to those skilled in the art. Thus, while the invention has been described with particular reference to specific embodiments, it is to be understood that it is not to be limited thereto but is to be construed broadly and restricted solely by the scope of the appended claims.

The embodiments of the invention in which an exclusive property or privilege is claimed are defined as follows:

1. A diphenethylbenzene-α,α',β,β'-tetracarboxylate having the formula

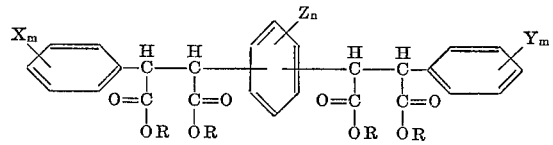

wherein R is hydrocarbyl having up to 18 carbon atoms and being selected from the group consisting of alkyl, alkenyl, cycloalkyl, phenyl, alkyl substituted phenyl or monocyclic aralkyl; Y is a monovalent hydrocarbyl or hydrocarbyl oxy each having up to 18 carbon atoms, nitro or halogen; Z is methyl, nitro or halogen; $m$ is a cardinal number from 0 to 5 inclusive; and $n$ is a cardinal number from 0 to 4 inclusive.

2. A compound according to claim 1 which is tetramethyl p-diphenethylbenzene-α,α',β,β'-tetracarboxylate.

3. A compound according to claim 1 which is tetraoctyl p-diphenethylbenzene-α,α',β,β'-tetracarboxylate.

4. A compound according to claim 1 which is tetraphenyl p-diphenethylbenzene-α,α',β,β'-tetracarboxylate.

References Cited

UNITED STATES PATENTS 3,293,276   12/1966   Kühle _____ 260—471

LORRAINE A. WEINBERGER, *Primary Examiner.*

L. A. THAXTON, *Assistant Examiner.*

U.S. Cl. X.R.
260—473, 471, 999